(12) United States Patent
Bergman et al.

(10) Patent No.: US 7,551,091 B2
(45) Date of Patent: Jun. 23, 2009

(54) DOOR WITH INTEGRAL ANTENNA

(75) Inventors: Adam Scott Bergman, Boca Raton, FL (US); Denis Chiasson, Boynton Beach, FL (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 238 days.

(21) Appl. No.: 11/492,330

(22) Filed: Jul. 25, 2006

(65) Prior Publication Data

US 2008/0024304 A1 Jan. 31, 2008

(51) Int. Cl.
*G08B 13/14* (2006.01)
(52) U.S. Cl. .................................. 340/572.7
(58) Field of Classification Search ... 340/572.1–572.9, 340/10.1, 825.72
See application file for complete search history.

(56) References Cited

U.S. PATENT DOCUMENTS

| 5,060,992 | A * | 10/1991 | Anderson | 292/207 |
| 2003/0174099 | A1 * | 9/2003 | Bauer et al. | 343/893 |
| 2004/0032331 | A1 * | 2/2004 | Okamura | 340/572.7 |
| 2004/0100392 | A1 * | 5/2004 | Brillon | 340/825.72 |
| 2005/0046572 | A1 * | 3/2005 | Hader | 340/572.7 |
| 2005/0052287 | A1 * | 3/2005 | Whitesmith et al. | 340/825.72 |
| 2006/0132312 | A1 * | 6/2006 | Tavormina | 340/572.7 |
| 2007/0024511 | A1 * | 2/2007 | Li et al. | 343/713 |
| 2007/0222606 | A1 * | 9/2007 | Phipps et al. | 340/572.7 |

FOREIGN PATENT DOCUMENTS

| DE | 3612761 A1 | 10/1987 |
| DE | 19729403 A1 | 2/1999 |
| DE | 19738938 A1 | 7/1999 |
| DE | 202005014531 U1 | 11/2005 |
| JP | 05235626 A | 9/1993 |
| JP | 2003165336 A | 6/2003 |
| JP | 2005041682 A | 2/2005 |

* cited by examiner

*Primary Examiner*—Phung Nguyen
(74) *Attorney, Agent, or Firm*—Christopher & Weisberg, P.A.

(57) ABSTRACT

A door and method of constructing a door whereby antenna coils are routed through channels that are incorporated within the frame of the door, and completely or partially hidden from sight. The door includes channels and or troughs that are sized to retain at least a portion of the antenna therein. The door can be purchased with the antenna wires already embedded therein and hidden from sight and installed at a facility without the need to mount the antenna wires on a pedestal or dig up floors and/or walls to embed the antenna coils. Existing doors can be retrofitted to install the antenna wires. Such antennas may be used, for example, in an RFID marker system or a magneto-acoustic EAS marker system.

17 Claims, 6 Drawing Sheets

SECTION A-A

DOOR WITH INTEGRAL ANTENNA

CROSS-REFERENCE TO RELATED APPLICATIONS n/a

STATEMENT REGARDING FEDERALLY SPONSORED RESEARCH OR DEVELOPMENT n/a

BACKGROUND OF THE INVENTION

1. Statement of the Technical Field

The present invention relates to antennas and more particularly to a door having an antenna integrated within its framework such that a door with an embedded antenna may be installed at the exit/entrance of a facility to provide surveillance without the antenna being visible.

2. Description of the Related Art

In a surveillance system, antennas, such as EAS ("Electronic Article Surveillance") antennas or RF (Radio Frequency) antennas transmit interrogation signals that are received by markers such as Radio Frequency ID (RFID) or magneto-acoustic markers, located on merchandise within an establishment. The markers send corresponding signals back to the antenna. Thus, the interaction between the antennas and the markers establish an interrogation zone that can provide an establishment, such as a retail store, with a security system for its merchandise. Conventional surveillance systems include antennas that are typically located on a pedestal situated near the entrance of a store. However, pedestals are typically not desired by small store owners since they take up much-needed space and provide an unappealing aesthetic look.

One attempted solution to the aforementioned problem faced by small retail stores is to hide the transmitter and receiver coils in the floor, walls and/or ceiling. This allows retailers to utilize valuable floor, wall and/or counter space, while still maintaining a merchandise security system. However, a problem that often arises with this attempted solution is the prohibitive construction costs associated with embedding coils in existing structures. Even if the store owner was willing to pay these costs, construction such as this is sometimes not allowed in rental situations, non-ground level locations, or in malls governed by strict construction rules.

Other attempted solutions have included routing loop antennas around doorways or externally mounting loop antennas on a door frame. Each includes inherent problems. In the former case, routing loop antennas around doorways involves digging into the floor leading to unwanted construction costs, while the latter attempt results in visible wires that are unsightly. Attempts such as these fail because they do not adequately integrate the antenna into the store's décor to make the antenna as invisible as possible. In addition, such antenna installations are difficult and expensive, are invasive to the store's flooring, and do not provide an efficient and effective surveillance system.

Therefore, what is needed is a door that integrates an antenna into the door construction such that the antenna is hidden from obvious sight, and enables a facility to order an "antenna-ready" door at the time of construction and add system electronics at a later time if desired without any significant invasive, time consuming and/or expensive construction.

SUMMARY OF THE INVENTION

The present invention addresses the deficiencies in the art with respect to the location and placement of antennas. An antenna, such as an EAS or an RF antenna, sends interrogation signals which are received by markers located on merchandise within a range of detection, i.e., an "interrogation zone". The markers send corresponding signals back to the antenna. Antennas used in these types of merchandise-surveillance systems are typically floor-mounted on a pedestal. Pedestals take up much-needed space, ordinarily reserved for merchandise, and are unsightly. In this regard, a door and method of constructing a door, is provided, whereby the antenna coils are routed through channels within the frame of the door, and completely or partially hidden from sight. A store owner can purchase "antenna-ready" doors, install the doors, and connect other components of the system to the embedded antenna wires. In this fashion, the antenna wires can be hidden from view within the door, thus removing unsightly pedestals and increasing floor and/or wall space.

According to one aspect, a method of constructing a door having an embedded antenna therein, is provided. The method includes providing a door, incorporating one or more channels within the door, where each channel is sized to retain at least a portion of the antenna, and inserting at least a portion of the antenna within the one or more channels.

According to another aspect of the invention, a door having an embedded antenna therein is provided. The door includes one or more antenna retention channels, wherein at least one channel is sized to retain at least a portion of the antenna.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

Figure 1:
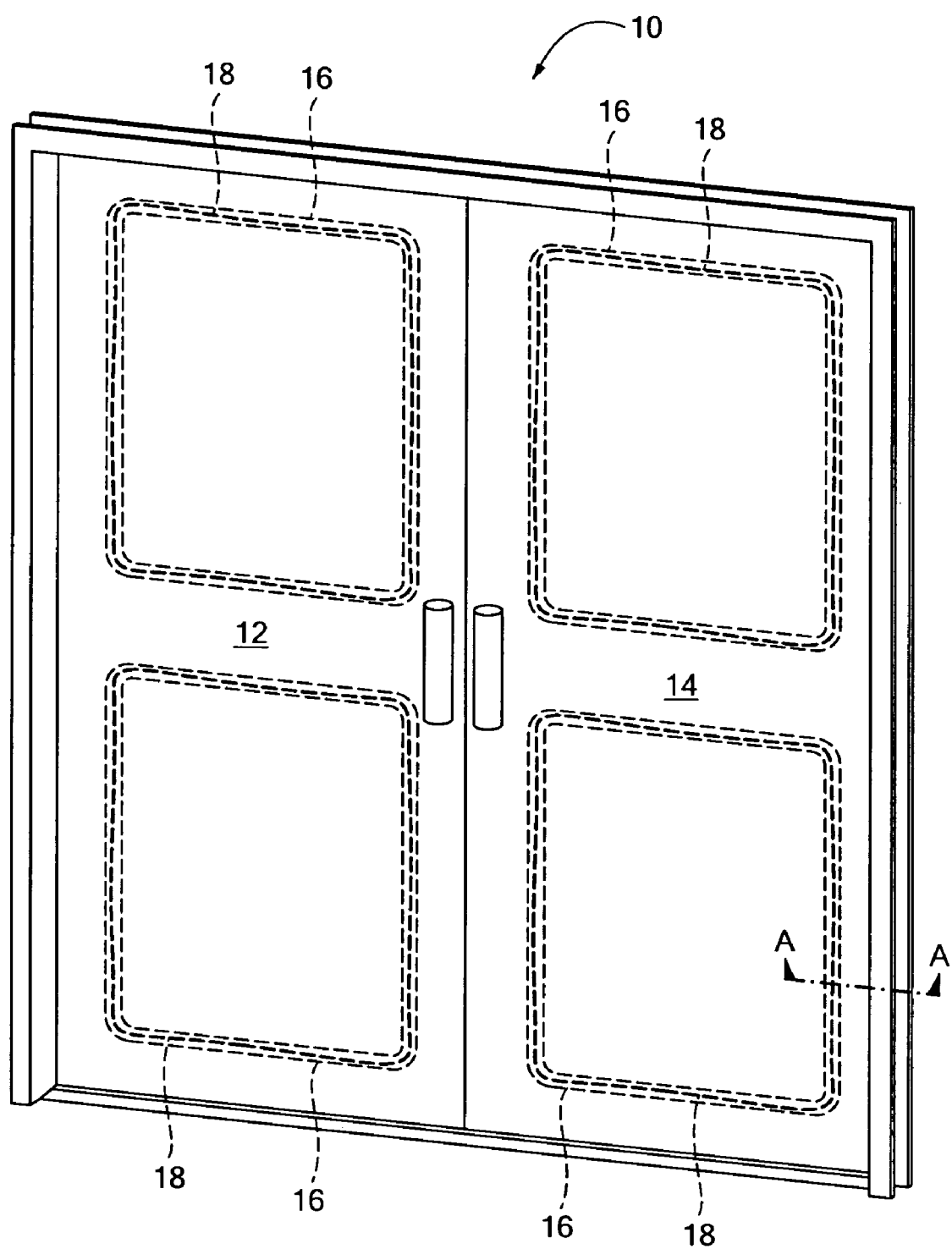
FIG. 1 is a diagram of a pair of wood doors having an embedded antenna in accordance with the principles of the present invention.

The present invention advantageously provides a door and a method of constructing a door that is fabricated to include channels, or guides, whereby the guides contain one or more conductors of an antenna that is part of an merchandise surveillance system. Referring now to the drawing figures in which like reference designators refer to like elements there is shown in FIG. 1 an apparatus constructed in accordance with the principles of the present invention and designated generally as "10." Apparatus 10 includes a pair of doors 12 and 14. Doors 12 and 14 may be of any dimension and material and may be located anywhere within a facility. In one embodiment, doors 12 and 14 are situated near an entrance/exit location in a facility, such as a retail store. Each door 12 and 14 includes one or more channels 16 within each door. Channel 16 is fabricated as part of the interior of the door such that the channel 16 is sized to retain an antenna wire 18 whereby the antenna wire 18 is hidden from sight, or at least partially obscured. FIG. 1 shows two doors 12 and 14 for illustrative purposes only. The invention is not limited to the number or location of the doors. Antenna 18 can be an EAS antenna such as may be used in a magneto-acoustic marker system, an RF antenna for an RFID marker system or any other type of antenna that can transmit communication signals to a marker, where the marker can detect the incoming signals.

Antenna 18 is part of a surveillance system used to monitor activity within the facility. The antenna 18 may be configured as a transceiver antenna with an associated controller (not shown) that provides control and switching to switch from transmitting to receiving functions at predetermined time intervals. Those skilled in the art will recognize that there may be a separate transmitting and receiving cables within antenna 18. Antenna 18 emits electromagnetic signals covering a certain interrogation zone within the facility. Within the interior of the facility such as a retail establishment, various markers are placed on items or assets to be protected within the interrogation zone. If the marker is not removed from the item or deactivated prior to entering the interrogation zone, the electromagnetic field established by antenna 18 will cause a response from the marker. This response is received by the receiving cable or the transceiver cable of the antenna 18.

In FIG. 1, a pair of wooden doors 12 and 14, includes channels 16 that contain antenna loops 18. Channels 16 can be made by routing a path within the frame of door 12 and door 14. In this embodiment, each door 12 and 14, includes two antenna wire loops 18 shown by the dashed lines in FIG. 1. The embedded antenna wire 18 need not be situated in the configuration shown in FIG. 1. For example, a single channel 16 can be provided around the perimeter of each door, thus resulting in a single embedded antenna loop 18 within each door. Other antenna loop 18 orientations are within the scope of the invention. Doors 12 and 14 may be purchased with channels 16 already incorporated therein. The retail store may request one or more doors with specific channel paths, depending upon the needs of the store, i.e., the size of the required interrogation zone, and the amount of antenna wire needed to properly monitor the interrogation zone. After receiving the doors with the channels 16 therein, the store may then insert antenna wire 18 within the channels 16, or have this procedure performed by a third party, or simply purchase the doors 12 and/or 14 with the antenna wires 18 already embedded therein.

Doors 12 and 14, when viewed from any angle, do not readily reveal the embedded antenna wires 18, or, in another embodiment, obscures a portion of the antenna 18. Because the antenna wires 18 are concealed within the interior of the door frame as opposed to mounting the conductors 18 on a pedestal, which is unsightly and may be difficult if space is limited and at a premium, the result is an appealing aesthetic look. The wooden doors 12 and 14 shown in FIG. 1 are illustrative only, and the invention is not limited to wooden doors or doors of a specific material.

Figure 2:
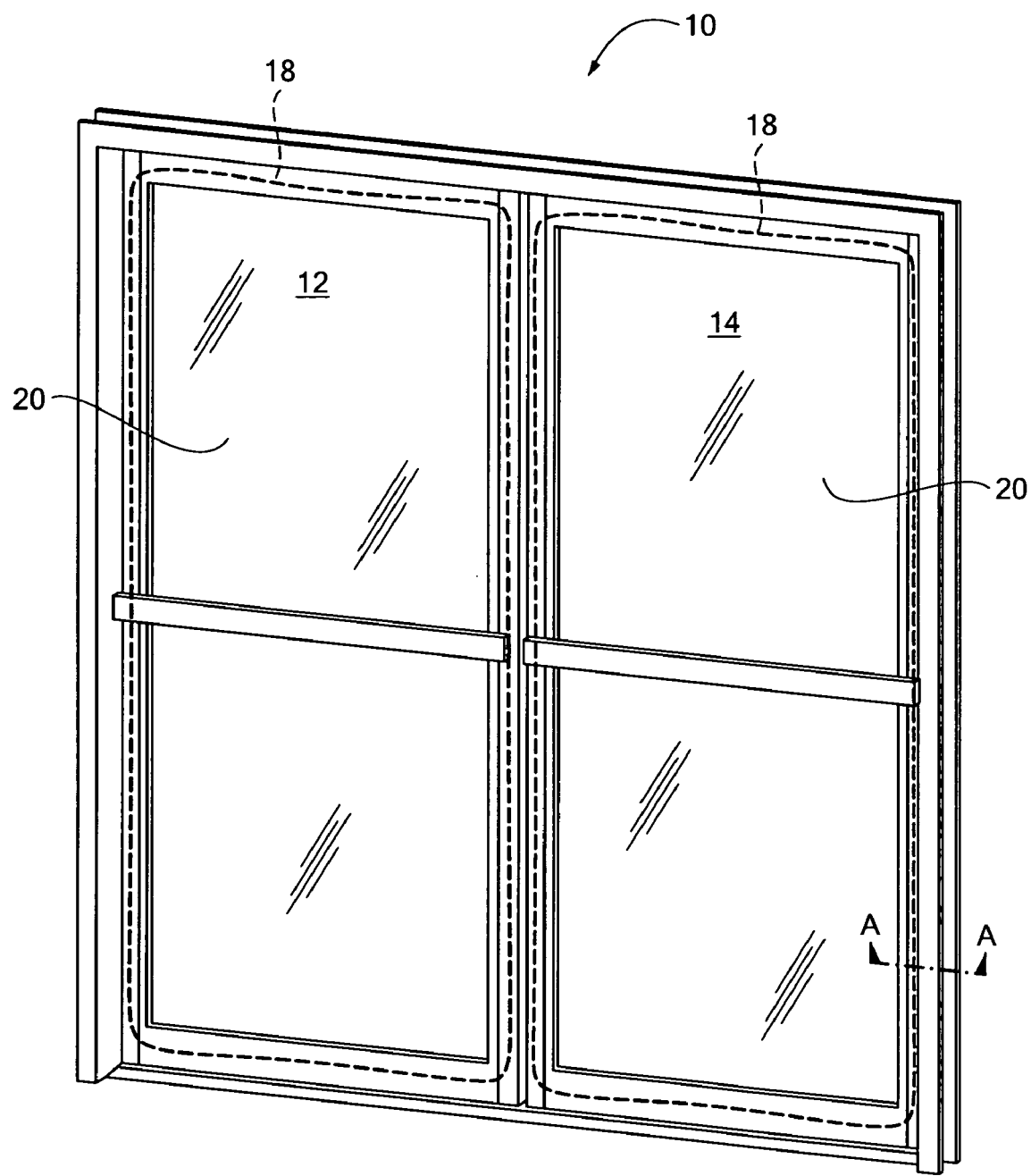
FIG. 2 is a diagram of a pair of metal doors having an embedded antenna in accordance with the principles of the present invention.

For example, in FIG. 2, a pair of metal doors 12 and 14, incorporating the features of the present invention, are shown. In this embodiment, each door 12 and 14, includes a pair of conductor loops 18 therein. Each loop 18 is routed through a channel 16 in each door. The channels 16 in metal doors 12 and 14 can be formed, for example, by extrusion of the frame elements of door 12 and door 14. In this example, the channel 16 is routed around the perimeter of each door frame. Unlike a wooden door, which typically does not include any window or other opening in the door, the metal doors 12 and 14 may each include a window 20. Thus, in order to hide the antenna wires 18 from view, the antenna wires 18 are routed in channels 16 provided within the perimeter of each door 12 and 14. The perimeter of each door 12 and 14 is non-transparent, thus hiding the antennas 18 from view. An air gap 22 is typically provided within the frame of metal doors 12 and 14 to prevent the antenna 18 from inducing a current in the metal door frame that would adversely impact the performance of the surveillance system.

Figure 3:
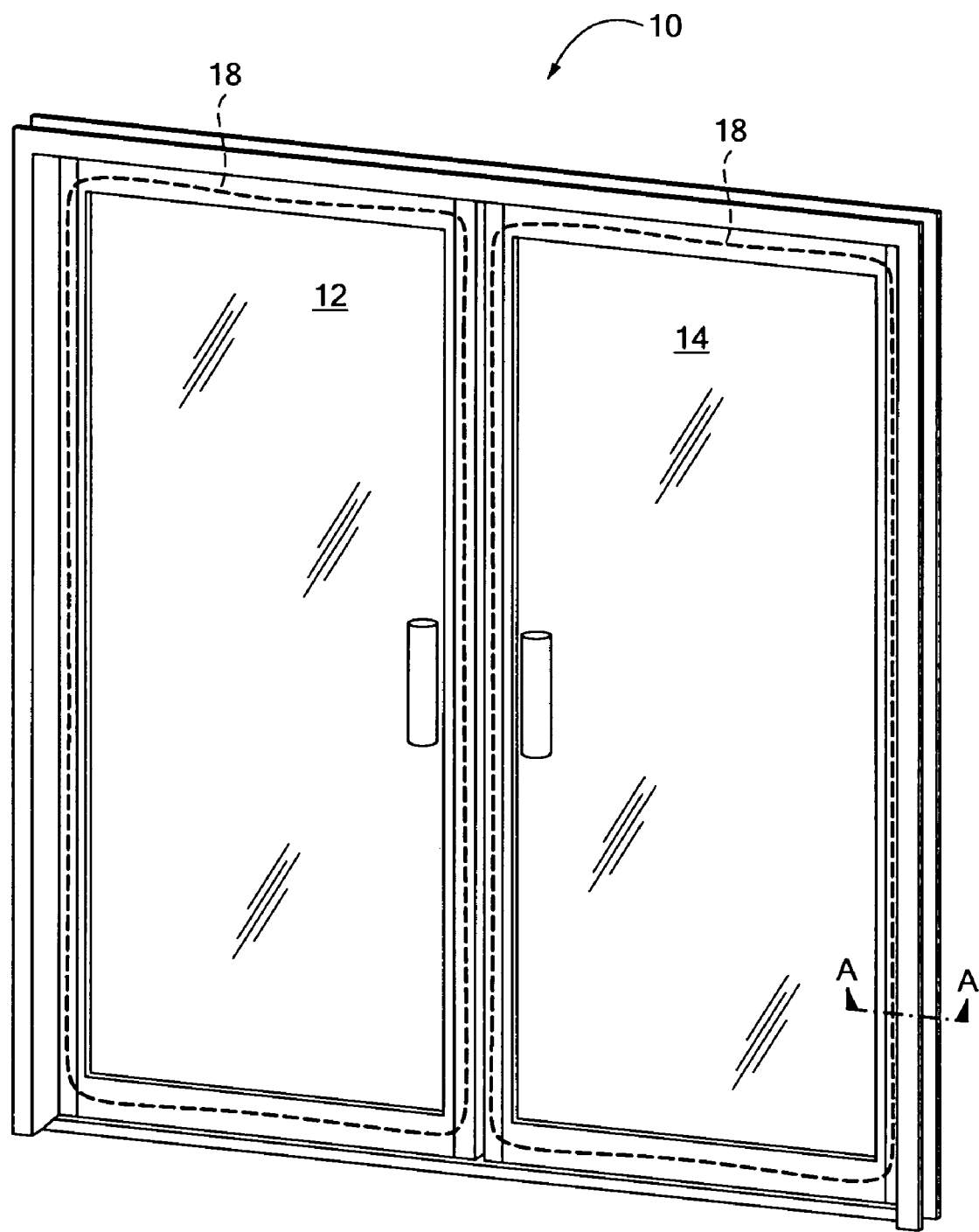
FIG. 3 is a diagram of a pair of glass doors having an embedded antenna in accordance with the principles of the present invention.

FIG. 3 illustrates the present invention used with glass doors 12 and 14. Antenna wires 18 are once again routed within the interior of doors 12 and 14 such that they cannot be seen, or are at least partially obscured. Glass doors 12 and 14 are typically comprised of opposing glass panes. Thus, for example, door 12 may be comprised of opposing glass panes, with an air gap therebetween. The glass panes form the front and the back of door 12. Antenna coil 18 is routed within a channel 16 and between each glass pane. The same concept may be used for glass door 14. In an alternate embodiment, an acrylic sheet can be inserted within the glass door frame, and antenna 18 embedded within the acrylic sheet.

Figure 4:
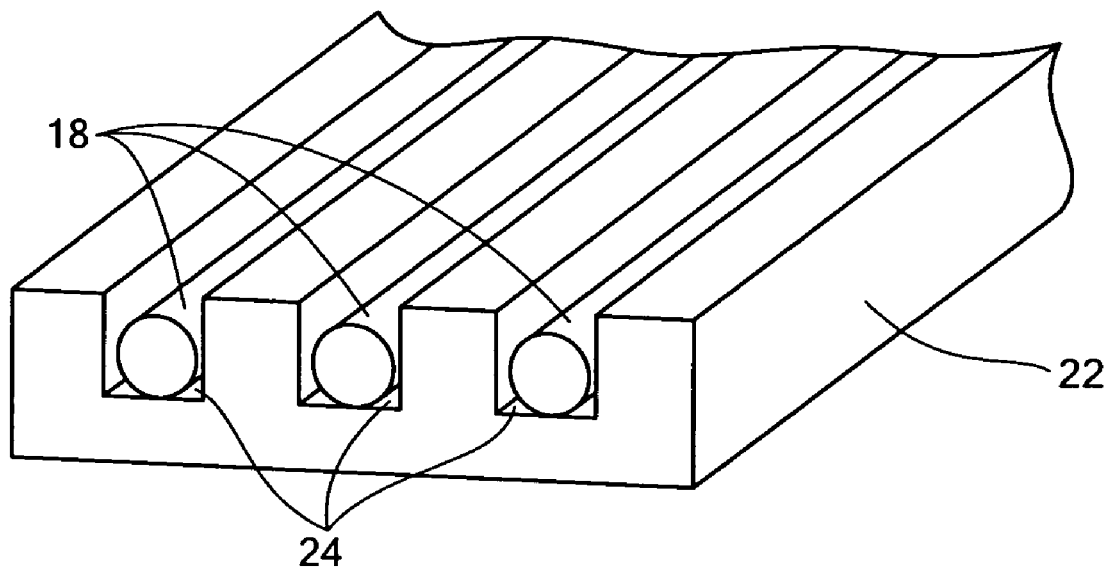
FIG. 4 is a sectional view taken along section A-A in FIGS. 1-3.

FIG. 4 is a sectional view taken along section A-A in FIGS. 1-3. FIG. 4 illustrates one embodiment of the present invention, whereby a single antenna coil 18 is routed and hidden within a corresponding channel 16, with the frame of doors 12 and 14. In the embodiment shown in FIG. 4, the section of door 12 is shown along the lines A-A, as illustrated in FIG. 1. Door frame 22 includes a series of longitudinal channels 16. Within each channel 16 is a single antenna coil 18. Thus, each antenna coil 18 is hidden within a corresponding channel 16, and is embedded with the door frame 22, and at least partially hidden from sight.

Figure 5:
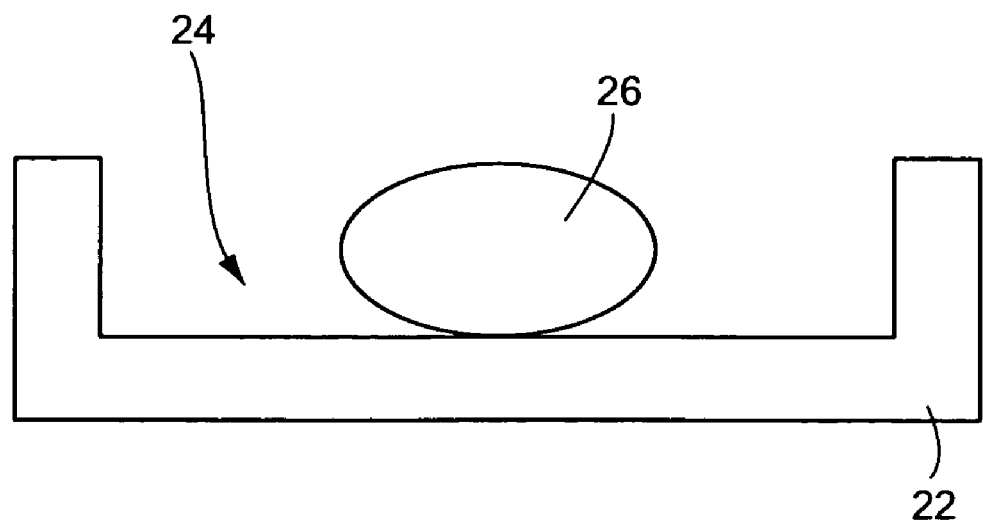
FIG. 5 is an alternate sectional view taken along section A-A in FIGS. 1-3.

FIG. 5 is an alternate sectional view taken along section A-A in FIGS. 1-3. In this embodiment, a single cable assembly 26, is inserted within a single trough 24, as depicted in FIG. 5. In this embodiment, only one trough 24 within frame 22 is required. It is within the scope of the invention to include multiple troughs 24 within the frame 22. Cable assembly 26 may contain all of the antenna wires 18 of the surveillance system. In this scenario, a single trough 24 is routed within door frame 22. In the case of glass doors being used, one glass pane including trough 24 and the cable assembly 26 therein, is "sandwiched" against the opposing glass pane.

Figure 6:
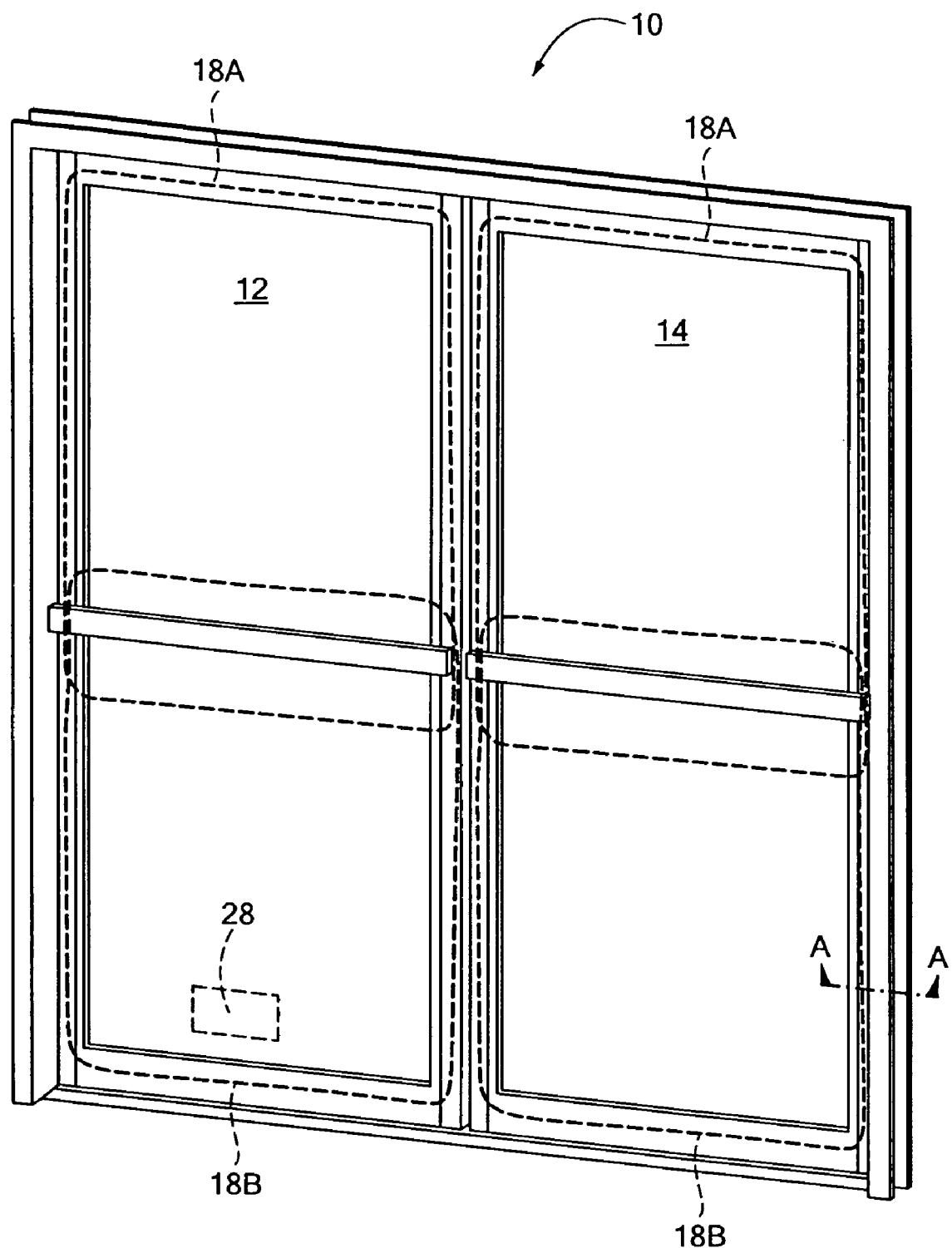
FIG. 6 is a diagram of a pair of metal doors having overlapping antenna loops and an embedded capacitor board.

FIG. 6 illustrates an alternate embodiment of the invention. As in the embodiment shown in FIG. 2, a pair of antenna loops 18 is shown; one in door 12 and one in door 14. However, in this embodiment, there is an overlap between the upper conductor loops 18A in doors 12 and 14 and the lower conductor loops 18B in door 12 and door 14. This embodiment illustrates the flexibility of the invention. Channels 16 may retain antenna wire 18 from different EAS antenna loops, and/or may contain more than one wire.

Figure 7:
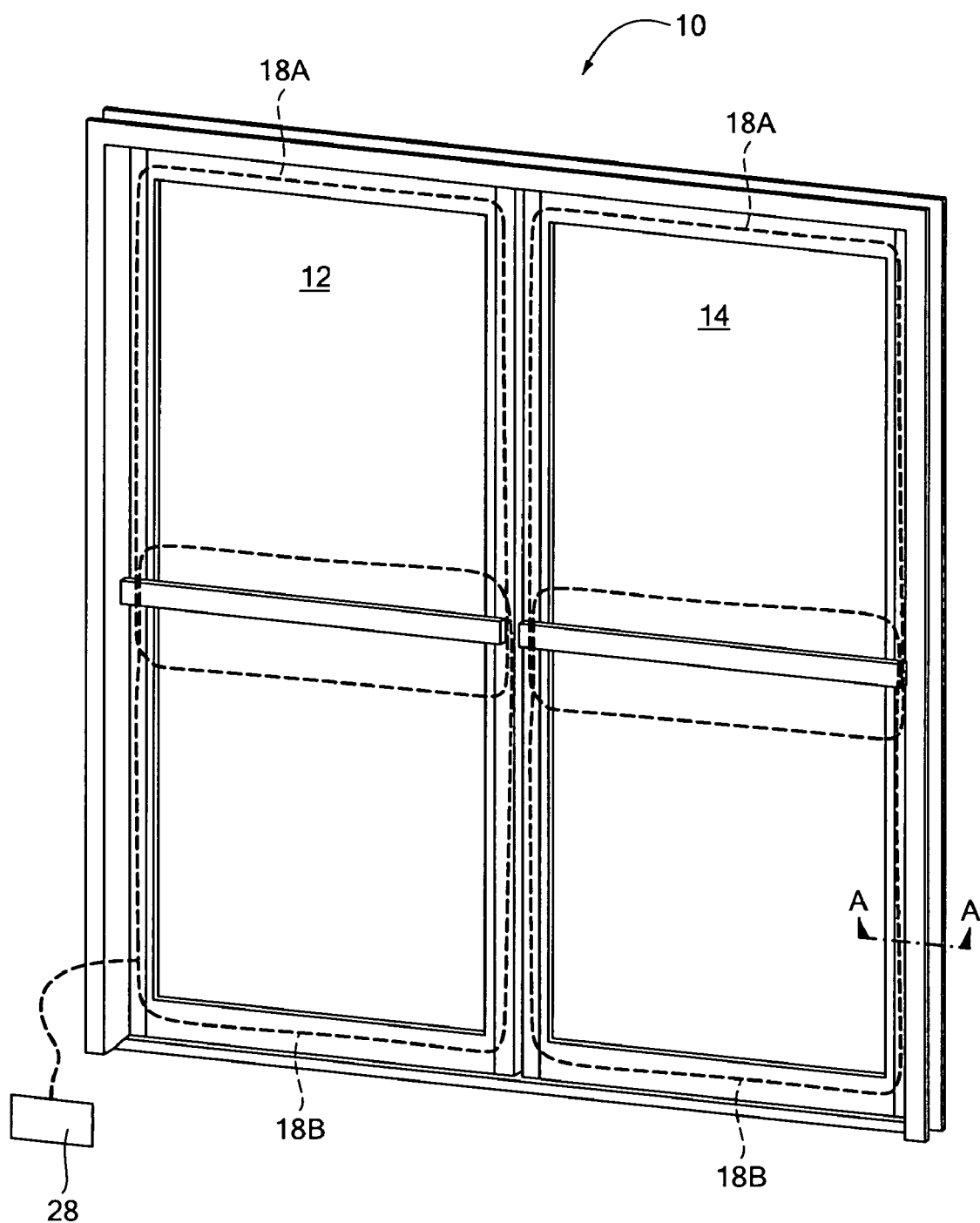
FIG. 7 is a diagram of a pair of metal doors having overlapping conductor loops whereby the capacitor board is remotely located.

Included in the door 12 shown in FIG. 6, is an embedded resonating capacitor board 28. Capacitor board 28 may be embedded anywhere within doors 12 or 14, such recessed within a separate trough 24 included within the frame of either door. Capacitor board 28 may be hidden from sight, similar to embedded antennas 18. In an alternate embodiment, as shown in FIG. 7, capacitor board 28 is not embedded within doors 12 or 14 but is situated at a different location, proximate the doors, yet in electric communication with the embedded antenna wires 18.

The capacitor board 28 described above need not be in physical proximity with the embedded antenna coils 18. Capacitor board 28 typically includes one or more resonating capacitors in a parallel or a series connection with antenna 18. The store owner, upon weighing the cost of embedding the capacitor board 28 within door 12, and the physical constraints of the interrogation zone, may choose not to embed board 28 and, instead, situation board 28 at a location near door 12. If capacitor board 28 is to be embedded within door 12, it will reside in either its own recessed trough 24 or within an existing recessed trough 24 or channel, that also contains other portions of the antenna 18.

The present invention incorporates a method of constructing doors 12 having embedded within the door's frame, at least a portion of an antenna 18. A store owner, for example, may wish to install a surveillance system to monitor marked items throughout the store. The store owner can place an order for a door 12 or set of doors 12 and 14, to be installed by the store's entrance or exit area. An order can be placed for a door 12 having an embedded antenna 18. The door 12 is fabricated to include one or more channels 16, where each channel 16 is sized to receive one or more antenna coils 18, along with, perhaps, other portions of the antenna 18 such as the resonating capacitor board 28. The channels 16 are provided within the frame 22 of door 12 such as by routing, extruding, etc., and portions of the antenna 18 inserted therein such that the antenna 18 is hidden or at least partially obscured from sight. The door 12 can be of any material such as but not including glass, aluminum, and or wood. The door 12, upon arrival at the store, can be installed near the store's entrance and the embedded antenna 18 electrically connected with other components of the surveillance system, without the need for any invasive construction.

The present invention therefore advantageously provides an apparatus and method that allows establishments such as retail stores to install surveillance systems where the antenna 18 is hidden from sight, or at least partially obscured within a door 12 proximate the entrance or exit location of the store. Particularly, the invention provides a door having one or more recesses or channels 16 incorporated within its frame 22. At least a portion of an antenna 18 is inserted within the channel 16. In one embodiment, a resonant capacitor board 28 is also embedded within a trough 24 in the frame 22 of the door 12. In another embodiment, the capacitor board 28 is not embedded within door 12, but placed at a separate location, where it is in electronic communication with the embedded antenna 18.

Significantly, this invention can be embodied in other specific forms without departing from the spirit or essential attributes thereof, and accordingly, reference should be had to the following claims, rather than to the foregoing specification, as indicating the scope of the invention.

We claim:

1. A method of constructing a door having an embedded antenna therein, the method comprising:
   providing a glass door having opposing panes of glass;
   incorporating one or more channels within the door, each channel being sized to retain at least a portion of the antenna; and
   inserting at least a portion of the antenna within the one or more channels and between the panes of glass.

2. The method of claim 1, wherein after insertion within the one or more channels, no portion of the antenna is visible.

3. The method of claim 1, wherein the one or more channels are arranged within a perimeter of the glass door.

4. The method of claim 1, further comprising inserting a resonating capacitor board within the one or more channels.

5. The method of claim 1, wherein each of the one or more channels is sized to retain multiple antenna coils.

6. The method of claim 1, wherein each of the one or more channels is sized to retain a single antenna coil.

7. The method of claim 1, wherein the antenna is part of an EAS interrogation system.

8. The method of claim 1, wherein the antenna is part of an RFID interrogation system.

9. A glass door having an embedded antenna therein, the glass door comprising:
   opposing panes of glass;
   one or more antenna retention channels, at least one channel being sized to retain at least a portion of the antenna, wherein at least a portion of the antenna is inserted between the panes of glass.

10. The glass door of claim 9, wherein no portion of the antenna is visible.

11. The glass door of claim 9, wherein the one or more antenna retention channels are arranged within a perimeter of the glass door.

12. The glass door of claim 9, wherein at least one channel is sized to retain a portion of a resonating capacitor board.

13. The glass door of claim 9, wherein each of the one or more channels is sized to retain multiple antenna coils.

14. The glass door of claim 9, wherein each of the one or more channels is sized to retain a single antenna coil.

15. The glass door of claim 9, wherein at least one of the one or more channels receives a plurality of antenna coils.

16. The glass door of claim 9, wherein the antenna is part of an EAS interrogation system.

17. The glass door of claim 9, wherein the antenna is part of an RFID interrogation system.

* * * * *